United States Patent
Takeda (10) Patent No.: US 7,206,684 B2
(45) Date of Patent: Apr. 17, 2007

(54) LANE DEPARTURE PREVENTION SYSTEM

(75) Inventor: Yuya Takeda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/318,201

(22) Filed: Dec. 23, 2005

(65) Prior Publication Data

US 2006/0142921 A1 Jun. 29, 2006

(30) Foreign Application Priority Data

Dec. 27, 2004 (JP) ............... 2004-377553
Nov. 25, 2005 (JP) ............... 2005-340187

(51) Int. Cl.
*G06F 19/00* (2006.01)

(52) U.S. Cl. ............... 701/70; 701/41; 701/301; 348/148

(58) Field of Classification Search ............... 701/1, 701/36, 41, 70, 300, 301; 348/148; 340/435, 340/436, 903
See application file for complete search history.

(56) References Cited

U.S. PATENT DOCUMENTS

| | | | |
|---|---|---|---|
| 6,879,890 B2 * | 4/2005 | Matsumoto et al. | ........ 701/23 |
| 6,970,777 B2 * | 11/2005 | Tange et al. | ........ 701/41 |
| 7,107,137 B2 * | 9/2006 | Tange et al. | ........ 701/70 |
| 7,117,076 B2 * | 10/2006 | Shimakage et al. | ........ 701/41 |
| 2003/0195687 A1 | 10/2003 | Tange et al. | |
| 2004/0010371 A1 | 1/2004 | Matsumoto et al. | |
| 2004/0107035 A1 * | 6/2004 | Tange et al. | ........ 701/70 |
| 2004/0186651 A1 | 9/2004 | Tange et al. | |
| 2005/0096827 A1 * | 5/2005 | Sadano et al. | ........ 701/70 |
| 2005/0107939 A1 * | 5/2005 | Sadano et al. | ........ 701/70 |
| 2005/0125125 A1 * | 6/2005 | Matsumoto et al. | ........ 701/41 |

FOREIGN PATENT DOCUMENTS

JP H0710026 1/1995
JP 2003112540 4/2003

OTHER PUBLICATIONS

Patent Abstract for JP2003112540.
Patent Abstract for JP-H0710026.
EP Search Report No. 05/258029.7 - 2423 dated Apr. 19, 2006.

* cited by examiner

*Primary Examiner*—Gary Chin
(74) *Attorney, Agent, or Firm*—Rader, Fishman & Grauer PLLC (57) ABSTRACT

The present lane departure prevention system comprises a position detector means for detecting positional information of a vehicle with respect to a lane of travel, a determining unit for comparing the positional information with a first threshold value indicating a predetermined positional relation with respect to the lane of travel, and determining a departure of the vehicle from the lane of travel on the basis of the comparison result, and a yaw moment applying unit for applying a yaw moment to the vehicle and switching a first process of applying the yaw moment to the vehicle only by steering wheels and a second process of applying the yaw moment to the vehicle by steering the wheels and applying a braking power to the wheels, on the basis of a traveling condition of the vehicle, when the determining unit determines that the vehicle departs from the lane of travel.

13 Claims, 10 Drawing Sheets

LANE DEPARTURE PREVENTION SYSTEM

RELATED APPLICATIONS

The disclosures of Japanese Patent Application Nos. 2004-377553, filed Dec. 27, 2004, and 2005-340187, filed Nov. 25, 2005, and Japanese Laid-Open Patent No. H07-10026, filed Jun. 29, 1993 and published Jan. 13, 1995, including their specifications, drawings and claims, are incorporated herein by reference in their entireties.

FIELD

Described herein is a system for preventing departure of a vehicle from a lane of travel.

BACKGROUND

In a lane departure prevention system for preventing a vehicle from departing from a lane of travel, braking power is selectively applied to the wheels to impart a yaw moment to the vehicle.

In such a system the driver may be discomforted, since the yaw moment is always generated by the use of braking power selectively applied to the wheels, thereby decelerating the vehicle.

On the other hand, when the vehicle is tending to depart from the lane of travel, the yaw moment may be imparted to the vehicle by appropriate steering, but the desired yaw moment may not be imparted to the vehicle by steering only, depending upon certain conditions of the vehicle with respect to the lane of travel, such as yaw angle or the like.

The present lane departure prevention system can optimally prevent lane departure in accordance with the traveling conditions of the vehicle without discomfort to the driver.

The present lane departure prevention system comprises a position detector means for detecting positional information of a vehicle with respect to a lane of travel; a determining unit for comparing the positional information with a first threshold value indicating a predetermined positional relationship with respect to the lane of travel, and for determining impending departure of the vehicle from the lane of travel on the basis of the result of the comparison; and a yaw moment applying unit for applying a yaw moment to the vehicle and switching between a first process of applying yaw moment to the vehicle only by steering its wheels and a second process of applying the yaw moment to the vehicle by steering its wheels and applying driving power to the wheels, on the basis of a traveling condition of the vehicle, when the determining unit determines that the vehicle is tending to depart from the lane of travel.

In the present lane departure prevention system it is possible optimally to prevent the vehicle from departing from the lane of travel in accordance with the traveling conditions of the vehicle without discomforting the driver, since a process for imparting the yaw moment to the vehicle only by steering its wheels and a process for imparting the yaw moment to the vehicle by steering the wheels and applying driving power to the wheels are selectively switched on the basis of the traveling conditions of the vehicle when it is determined whether the vehicle is tending to depart from the lane of travel,

BRIEF DESCRIPTION OF THE DRAWINGS

For a more complete understanding of the present lane departure prevention system, and the advantages thereof, reference is now made to the following description taken in conjunction with the accompanying drawings, in which.

DETAILED DESCRIPTION OF THE ILLUSTRATED EMBODIMENT

While the appended claims are not limited to the illustrated embodiment, an appreciation of various aspects of the present system is best gained through a discussion of various examples thereof.

The illustrated embodiment is described as being installed in an example of a rear-wheel drive vehicle having a lane departure prevention system. The vehicle is equipped with an automatic transmission, a conventional differential gear, and a braking system for independently controlling the braking power applied to all wheels, left and right and front and rear.

The front and rear wheels of the vehicle can be steered simultaneously. Examples of such a vehicle may include one having a front active steering system capable of changing the angle of a steering wheel manually operated by the driver and the steering angle of a steered front wheel and a rear-wheel steering system, or a vehicle having a so-called steer-by-wire system. The present embodiment may be applied to all such vehicles.

Figure 1:
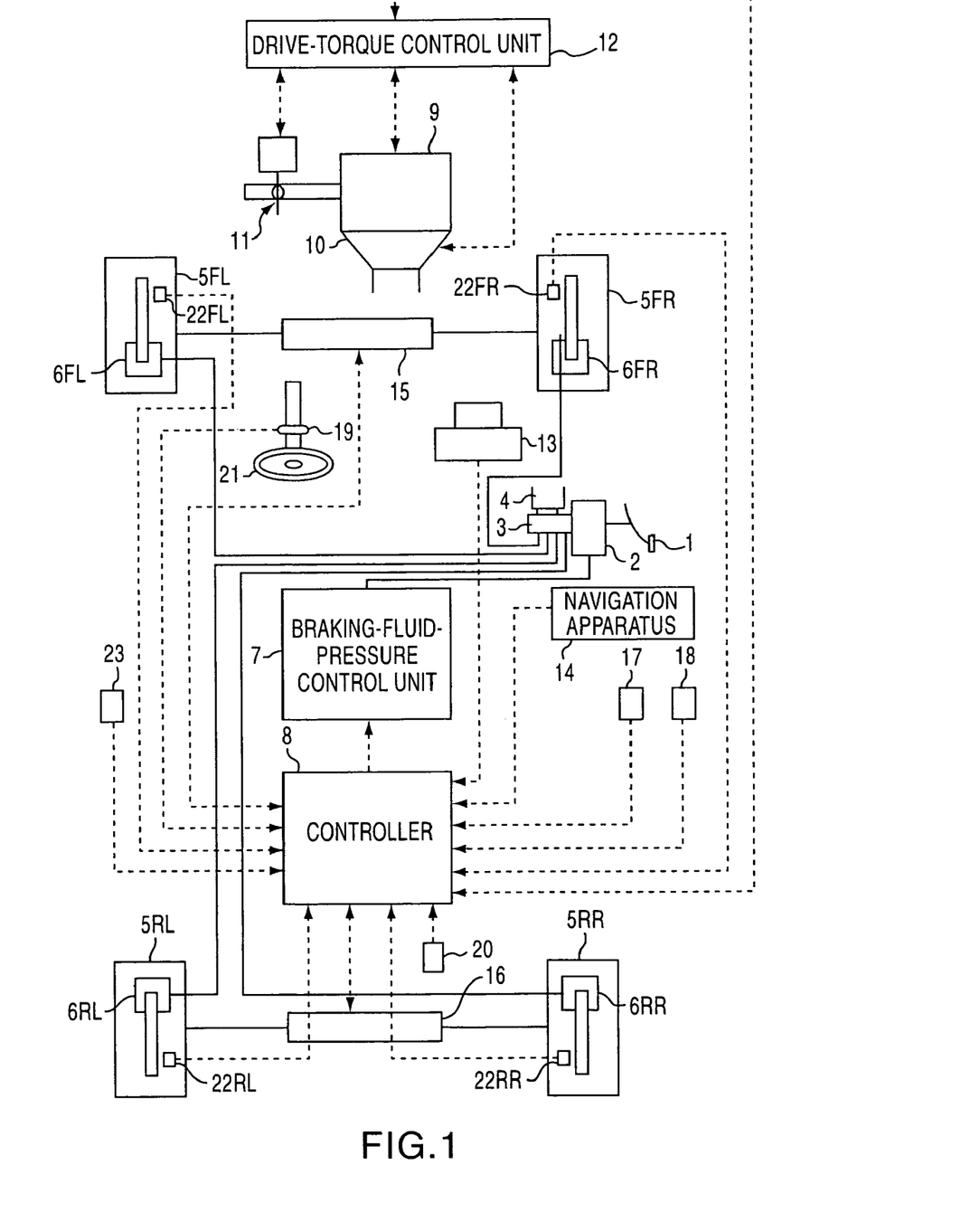
FIG. 1 is a schematic structural diagram illustrating an example of a vehicle in which the present lane departure prevention system is installed.

FIG. 1 is a schematic structural diagram illustrating an example of the present lane departure prevention system.

As shown in FIG. 1, the braking system comprises a brake pedal 1, a booster 2, a master cylinder 3, and a reservoir 4. Generally, braking fluid pressure boosted by the master cylinder 3 is supplied to wheel cylinders 6FL to 6RR of respective wheels 5FL to 5RR according to the degree of depression of the brake pedal 1 by a driver. However, a braking-fluid-pressure control circuit 7 may be provided between the master cylinder 3 and the respective wheel cylinders 6FL to 6RR, and the braking fluid pressures of the respective wheel cylinders 6RL to 6RR may be individually controlled by the braking-fluid-pressure control circuit 7.

For example, a braking-fluid-pressure control circuit used for antiskid control or traction control may be employed as the braking-fluid-pressure control circuit 7. In the present embodiment, the braking-fluid-pressure control circuit can independently boost and reduce the braking fluid pressures of the respective wheel cylinders 6FL to 6RR. The braking-fluid-pressure control circuit 7 controls the braking fluid pressures of the respective wheel cylinders 6FL to 6RR according to the value of a braking-fluid-pressure command transmitted from a controller 8, described below.

For example, the braking-fluid-pressure control unit 7 includes an actuator in its fluid pressure supply system. Examples of the actuator may include a proportional solenoid valve for controlling the individual fluid pressure at each of the respective wheel cylinders at any suitable value.

The vehicle is provided with a drive torque control unit 12 for controlling drive torque of the rear wheels 5RL and 5RR, the drive wheels in this case, by controlling the operational status of an engine 9, a selected speed-change ratio of an automatic transmission 10, and the throttle opening of a throttle valve 11. The operational status of the engine 9 can be controlled, for example, by controlling the volume of fuel injection or ignition timing, and can also be controlled by adjusting the throttle opening. The drive torque control unit 12 transmits the value of the drive torque Tw to the controller 8.

The vehicle is also provided with a front-wheel steering control unit 15 for controlling the steering of the front wheels 5FL and 5FR and a rear-wheel steering control unit 16 for controlling the steering of the rear wheels 5RL and 5RR. The front-wheel steering control unit 15 and the rear-wheel steering control unit 16 control steering in accordance with steering command values received from the controller 8.

The vehicle is provided with an image pickup unit 13 having an image processing capability. The image pickup unit 13 is used to detect any lane departure tendency of the vehicle and serves to detect the position of the vehicle in the lane of travel. By way of example, the image pickup unit 13 may include a monocular CCD (Charge Coupled Device) camera. The image pickup unit 13 is provided at the front portion of the vehicle.

The image pickup unit 13 detects lane markers such as white lines from an image of the front end of the vehicle and ascertains the lane of travel from the detected lane markers. The image pickup unit 13 calculates an angle (yaw angle) $\phi$ formed by the lane of travel and a longitudinal axis of the vehicle, a lateral displacement X of the vehicle from the center of the lane, and lane curvature $\beta$ on the basis of the detected lane. The image pickup unit 13 transmits signals representing yaw angle $\phi$, the lateral displacement X, and the lane curvature $\beta$ (road radius R) to the controller 8.

The vehicle is also equipped with a navigational apparatus 14. The navigational apparatus 14 detects forward acceleration Yg, lateral acceleration Xg, or a yaw rate $\phi'$ of the vehicle. The navigational apparatus 14 transmits signals representing forward acceleration Yg, lateral acceleration Xg, and yaw rate $\phi'$, along with road information, to the control unit 8. The road information may include the number of lanes and road-type information indicating whether the road is a general road or a highway.

In addition, the vehicle is provided with a master cylinder pressure sensor 17 for detecting output pressure of the master cylinder 3; that is, master cylinder fluid pressures Pmf and Pmr, an accelerator opening sensor 18 for detecting the degree of depression of the accelerator pedal; that is, the degree of opening $\theta t$ of the accelerator, a steering angle sensor 19 for detecting the steering angle $\delta$ of a steering wheel 21, a direction indicator switch 20 for detecting direction indication operation of a direction indicator, and wheel speed sensors 22FL to 22RR for detecting rotational speeds of the respective vehicle wheels 5FL to 5RR; that is, so-called wheel speeds Vwi (where i=fl, fr, rl, rr). The detection signals of the sensors are transmitted to the controller 8.

When the detected data of the traveling status of the vehicle includes left and right directionalities, it is supposed that the left direction is plus or positive (and the right direction is minus or negative). That is, yaw rate $\phi'$, lateral acceleration Xg, and yaw angle $\phi$ have a positive value when the vehicle turns to the left. The lateral displacement X has a plus or positive value when the vehicle departs to the left from the center of the lane of travel. The forward acceleration Yg has a plus or positive value upon acceleration and a minus or negative value upon deceleration.

Figure 2:
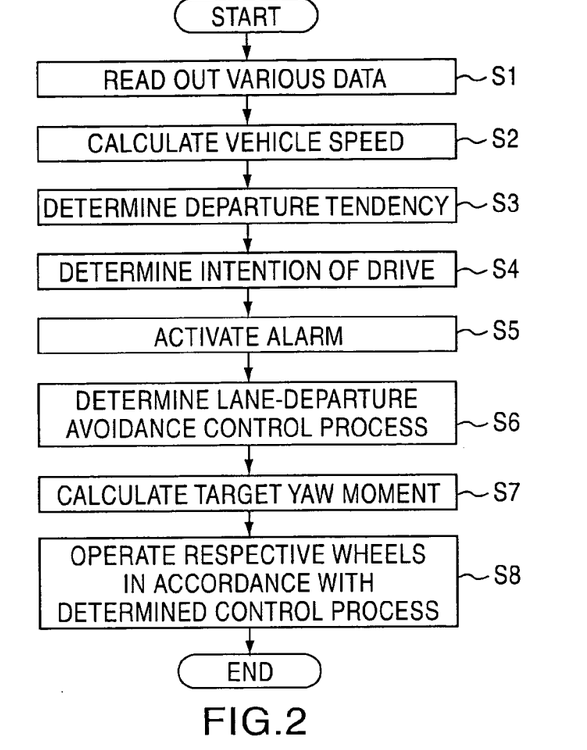
FIG. 2 is a flowchart illustrating details of a process executed by a controller of the lane departure prevention system.

A computing process executed by the controller 8 will now be described with reference to FIG. 2. The computing process is executed by means of timer interruption every predetermined sampling period of time $\Delta T$, for example, 10 msec. Although a communication process is not specifically provided in the computing processes of FIG. 2, the information obtained through the computing processes is updated and stored in a storage device on an as-needed basis and necessary information is read out from the storage device at any time on an as-needed basis.

First, in step S1 of the computing process, various data are read from the sensors, the controller, and the control units. In particular, the information read includes the coefficient of friction of the road surface obtained by the road-surface friction coefficient estimating unit 23; the information obtained by the navigational apparatus 14, such as traveling acceleration Yg, lateral acceleration Xg, yaw rate $\phi'$, and road information; and the information detected by the respective sensors such as wheel speeds Vwi, steering angle $\delta$, the opening degree $\theta t$ of the accelerator, the master cylinder pressures Pmf and Pmr, the direction indicator switch signal, drive torque Tw from the drive torque control unit 12, yaw angle $\phi$, lateral displacement X, and any curvature $\beta$ of the lane of travel.

Subsequently, in step S2, vehicle speed V is calculated. Specifically, vehicle speed V is calculated from the following Equation (1) on the basis of wheel speeds Vwi read in step S1:

In the case of front-wheel drive, $$V=(Vwrl+Vwrr)/2$$

In the case of rear-wheel drive, $$V=(Vwfl+Vwfr)/2 \qquad (1)$$

Vwfl and Vwfr are the wheel speeds of the respective left and right front wheels and Vwrl and Vwrr are the wheel speeds of the respective left and right rear wheels. That is, the vehicle speed V is calculated as an average value of the wheel speeds of the driven wheels in Equation (1). Therefore, since, in the present embodiment, a rear-wheel drive vehicle is described as an example, vehicle speed V is calculated from the latter Equation, that is, the wheel speeds of the rear wheels.

The vehicle speed V calculated as described above is preferably used for normal driving operation. For example, when an ABS (Anti-lock Brake System) control is activated, vehicle speed estimated in the ABS control may be used as the vehicle speed V. A value used as navigational information in the navigational apparatus 14 may also be taken as vehicle speed V.

Figure 3:
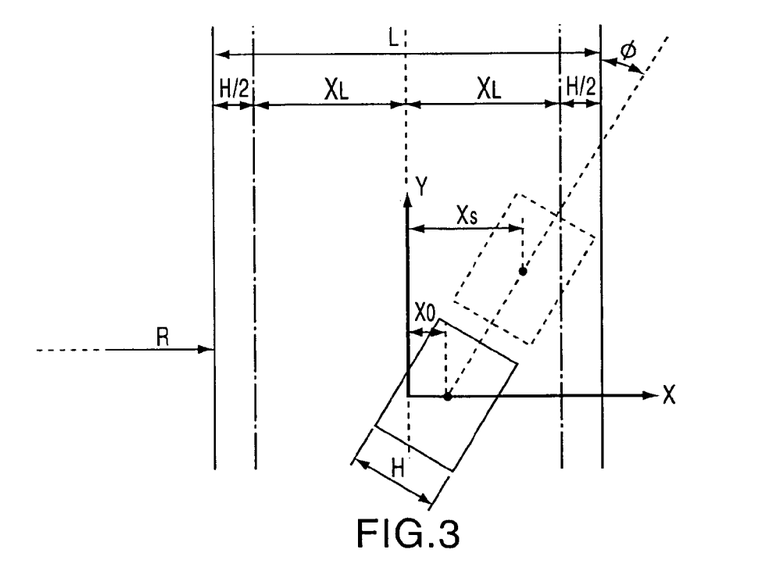
FIG. 3 is a diagram illustrating estimated lateral displacement Xs or departure threshold value XL.

Subsequently, in step S3, a tendency to depart from the lane is determined on the basis of the result of comparing the position of the vehicle relative to the lane of travel and a predetermined threshold value thereof. Specifically, an estimated future lateral displacement Xs is first calculated from the following Equation (2), using yaw angle $\phi$, lane of travel curvature $\beta$, and current lateral displacement X0 of the vehicle obtained in step S1, and vehicle speed V obtained in step S2, (see FIG. 3):

$$Xs = Tt \cdot V \cdot (\phi + Tt \cdot V \cdot \beta) + X0 \qquad (2)$$

Tt is headway time for calculating a front focal-point distance, obtained by multiplying headway time Tt by vehicle speed V. That is, the estimated value of lateral displacement from the center of the lane after lapse of headway time Tt is the estimated future lateral displacement Xs.

As is evident in Equation (2), the estimated lateral displacement Xs increases as yaw angle $\phi$ increases.

The tendency to depart from the lane is determined by comparing the estimated lateral displacement Xs with a predetermined departure threshold value (effective lateral displacement) $X_L$, from which it can be generally determined that the vehicle is tending to depart from the lane of travel and is obtained through routine experimentation. For example, the departure threshold value $X_L$ is a value indicating the position of a boundary of the lane of travel and is calculated from the following Equation (3) (see FIG. 3):

$$X_L = (L-H)/2 (>0) \qquad (3)$$

Here, L is lane width and H is the width of the vehicle. The lane width L is obtained from the image taken by the image pickup unit 13. The position of the vehicle may be obtained from the navigational apparatus 14 or the lane width L may be obtained from map data of the navigational apparatus 14.

It is determined that the vehicle is tending to depart from the lane, and the departure flag Fout is set at ON (Fout=ON) when the following Equation (4) is satisfied:

$$|Xs| \geq X_L \qquad (4)$$

On the other hand, it is determined that the vehicle is not tending to depart from the lane, and the departure flag Fout is set at OFF (Fout=OFF) when the following Equation (5) is satisfied:

$$|Xs| < X_L \qquad (5)$$

Here, a departure direction Dout is determined on the basis of the lateral displacement X. Specifically, when the vehicle laterally departs to the left from the center of the lane of travel, the left direction is set as the departure direction Dout (Dout=left), and when the vehicle laterally departs to the right from the center of the lane of travel, the right direction is set as the departure direction Dout (Dout=right).

In this manner, the tendency of lane departure is determined in step S3.

The threshold value $X_L$ may be L/2 (which indicates the same position as the lane) and may be greater than L/2 (which indicates the outside of the lane). The starting time of a lane-departure prevention control process can be adjusted by adjusting the threshold value $X_L$. Lane departure may be determined by comparing the threshold value $X_L$ with the current lateral displacement X0 of the vehicle instead of the estimated lateral displacement Xs at the front focal point.

Thus, the departure flag Fout is set at ON, when the vehicle actually departs from the lane, before the vehicle departs from the lane, or after the vehicle departs from the lane, depending on the setting of the threshold value $X_L$.

In step S4, it is determined that the driver is intentionally changing lanes. Specifically, the driver's intention to change lanes is determined as described below, on the basis of the direction indicator signal and the steering angle $\delta$ obtained in step S1.

When the direction (the right or left side light of a blinker or turn signal) indicated by the direction indicator signal is the same as the departure direction Dout obtained in step 3, it is determined that the driver is intentionally changing lanes, and the departure flag Fout is changed to OFF (Fout=OFF). That is, the information that the vehicle is tending to depart from the lane is changed to the determination that the vehicle is not tending to depart from the lane.

When the direction indicated by the direction indicator signal is different from the departure direction Dout obtained in step S3, the departure flag Fout is maintained without change; that is it remains "ON," as it is (Fout=ON). That is, the determination that the vehicle is tending to depart from the lane is maintained.

When the direction indicator switch 20 is not actuated, whether the driver is intentionally changing lanes is determined in accordance with the steering angle $\delta$. That is, when the driver steers the vehicle in the direction of departure, and the steering angle $\delta$ and the variation (variation per unit time) $\Delta\delta$ of the steering angle are greater than or equal to predetermined values, respectively, it is determined that the driver is intentionally changing lanes and the departure flag Fout is changed to OFF (Fout=OFF).

When the departure flag Fout is ON and the driver is not intentionally changing the lanes, the departure flag Fout is maintained as "ON."

Subsequently, in step S5, when the departure flag Fout is ON, an audible or visual alert is generated in order to alert the driver to the lane departure.

Subsequently, in step S6, details of the lane-departure avoidance control are determined. Specifically, it is determined whether lane-departure avoidance control is to be exercised by steering the wheels or applying braking power to the wheels on the basis of the coefficient of friction μ of the road surface and the configuration of the lane of travel.

Figure 4:
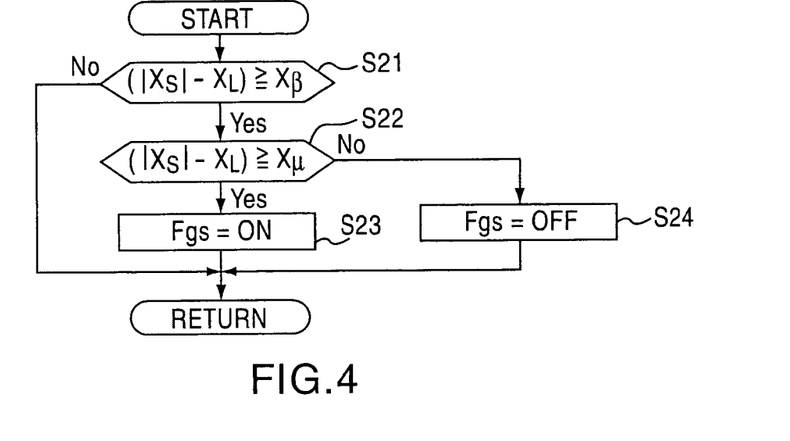
FIG. 4 is a flowchart illustrating a process of determining a lane departure control method executed by a controller.

FIG. 4 shows an example of a computing process for such a determination.

First, in step S21, a subtraction value ($|Xs|-X_L$), obtained by subtracting the effective lateral displacement $X_L$ from the estimated lateral displacement Xs calculated in step S3 is compared with a first control threshold value $X_\beta$. The subtraction value ($|Xs|-X_L$) indicates a degree of departure of the vehicle from the lane of travel. As the subtraction value increases, the degree of departure of the vehicle increases.

The first control threshold value $X_\beta$ is a value which is set based on lane curvature $\beta$. When the lane curvature $\beta$ is great toward the outside of the turning lane; that is, when the curve is sharp, the first control threshold value $X_\beta$ is set at a lower value.

Figure 5:
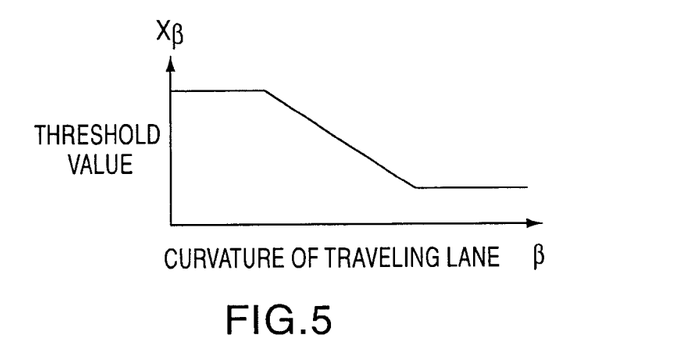
FIG. 5 is a graph illustrating the relationship between lane of travel curvature $\beta$ and a first control threshold value $X_\beta$.

FIG. 5 shows the relationship between lane curvature $\beta$ and the first control threshold value $X_\beta$ when the departure direction and the direction of the curve are opposite to each other. As shown in FIG. 5, the first control threshold value $X_\beta$ is constant with a high value when lane curvature $\beta$ is small, the first control threshold value $X_\beta$ is in inverse proportion to lane curvature $\beta$ when lane curvature $\beta$ is greater than a predetermined value, and the first control threshold value $X_\beta$ is constant with a low value as lane curvature $\beta$ becomes greater. That is, roughly, as lane curvature $\beta$ increases, the first control threshold value $X_\beta$ is set at a lower value.

The first control value $X_\beta$ may be established on the basis of yaw angle $\phi$. In such a case, as shown in FIG. 5, the first control threshold value $X_\beta$ is set at a high constant value when yaw angle $\phi$ is small, the first control threshold value $X_\beta$ is inversely proportional to yaw angle $\phi$ when yaw angle $\phi$ is greater than a predetermined value, and the first control threshold value $X_\beta$ is set at a low constant value when yaw angle $\phi$ further increases.

The first control threshold value $X_\beta$ may be set on the basis of both lane curvature $\beta$ and yaw angle $\phi$. In such a case, the first control threshold value $X_\beta$ can be established by selecting the lower value from a threshold value set based on lane curvature $\beta$ and a threshold value set based on yaw angle $\phi$.

When the following Equation (6) is satisfied, the process proceeds to step S22:

$$|Xs|-X_L \geq X_\beta \qquad (6)$$

Otherwise, that is, when ($|Xs|-X_L<X_\beta$), the process shown in FIG. 4 (step S6) is terminated. In step S22, the subtraction value ($|Xs|-X_L$) is compared with a second control threshold value $X_\mu$.

Figure 6:
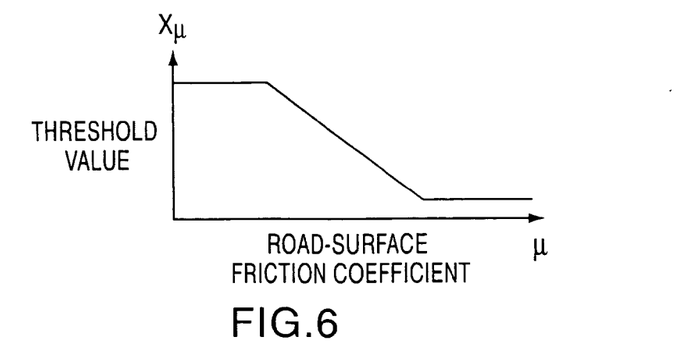
FIG. 6 is a graph illustrating the relationship between the coefficient of friction $\mu$ of a road surface and a second control threshold value $X_\mu$.

The second control threshold value $X_\mu$ is a value established on the basis of the coefficient of friction $\mu$ of the road surface, and FIG. 6 shows the relationship between the coefficient $\mu$ and the second control threshold value $X_\mu$. As shown in FIG. 6, the second control threshold value $X_\mu$ is constant at a high value when the coefficient $\mu$ is low, the second control threshold value $X_\mu$ is inversely proportional to the coefficient $\mu$ when the coefficient $\mu$ is greater than a predetermined value, and the second control threshold value $X_\mu$ is constant at a low value as the coefficient $\mu$ becomes greater. That is, roughly, as the coefficient $\mu$ increases, the second control threshold value $X_\mu$ becomes lower.

When the following Equation (7) is satisfied, the braking-power-difference control flag Fgs turns to ON (Fgs=ON) in step S23 and the process shown in FIG. 4 is terminated:

$$|Xs|-X_L \geq X_\mu \qquad (7)$$

Otherwise, that is, when ($|Xs|-X_L<X_\mu$), the braking-power-difference control flag Fgs turns to OFF (Fgs=OFF) in step S24 and the process shown in FIG. 4 is terminated.

In the process, when the estimated lateral displacement Xs is greater than or equal to the first control threshold value $X_\beta$ and greater than or equal to the second control threshold value $X_\mu$, the braking-power-difference control flag Fgs is set at ON.

Since the first control threshold value $X_\beta$ decreases as lane curvature $\beta$ increases, or since the second control threshold value $X_\mu$ decreases as the road-surface coefficient of friction $\mu$ increases, the braking-power-difference control flag Fgs can readily be set at ON. In other words, as lane curvature $\beta$ decreases, or as the coefficient $\mu$ decreases, the braking-power-difference control flag Fgs can readily be set at OFF.

Steps 21 and 22 in FIG. 4 are interchangeable. That is, the comparison with the second control threshold value $X_\mu$ may be first carried out, and then the comparison with the first control threshold value $X_\beta$ may be carried out. Alternatively, only the comparison with either the first control threshold value $X_\beta$ or second control threshold value $X_\mu$ may be carried out.

In relationship with the departure flag Fout set in step S3, as in Equations (4) to (7), the determination position of the braking-power-difference control flag Fgs may be further out from the determination position of the departure flag Fout in the transverse direction of the lane of travel. That is, for example, when the estimated lateral displacement Xs is simply greater than the effective later displacement $X_L$, only the departure flag Fout is set at ON but when the estimated lateral displacement Xs is greater than the effective later displacement $X_L$ by a predetermined value ($X_\beta$ or $X_\mu$), the braking-power-difference control flag Fgs, in addition to the departure flag Fout, is set at ON. In other words, when the departure flag Fout is set at ON but the estimated lateral displacement Xs is greater than the effective lateral displacement $X_L$ by the predetermined value ($X_\beta$ or $X_\mu$), departure avoidance control is performed only by steering the wheels. Thereafter, when the degree of departure from the lane of travel increases and the estimated lateral displacement Xs is greater than the effective lateral displacement $X_L$ by the predetermined value ($X_\beta$ or $X_\mu$), the departure avoidance control is performed by selectively applying braking power to the wheels and by steering the wheels.

As described below, lane-departure avoidance control by steering the wheels or applying braking power to the wheels is performed on the basis of the braking-power-difference control flag Fgs set in the above-described manner.

Subsequently, in step S7, the target yaw moment Ms to be applied to the vehicle through lane-departure avoidance control is calculated. The target yaw moment is a yaw moment to be applied to the vehicle in order to avoid departure from the lane of travel.

Specifically, the target yaw moment Ms is calculated from the following Equation (8), using the estimated lateral displacement Xs obtained in step S3 and the effective lateral displacement $X_L$:

$$Ms=K1 \cdot K2 \cdot (|Xs|-X_L) \qquad (8)$$

K1 is a proportional coefficient defined from the specifications of the vehicle, and K2 is a gain which varies with variation of vehicle speed V.

Figure 7:
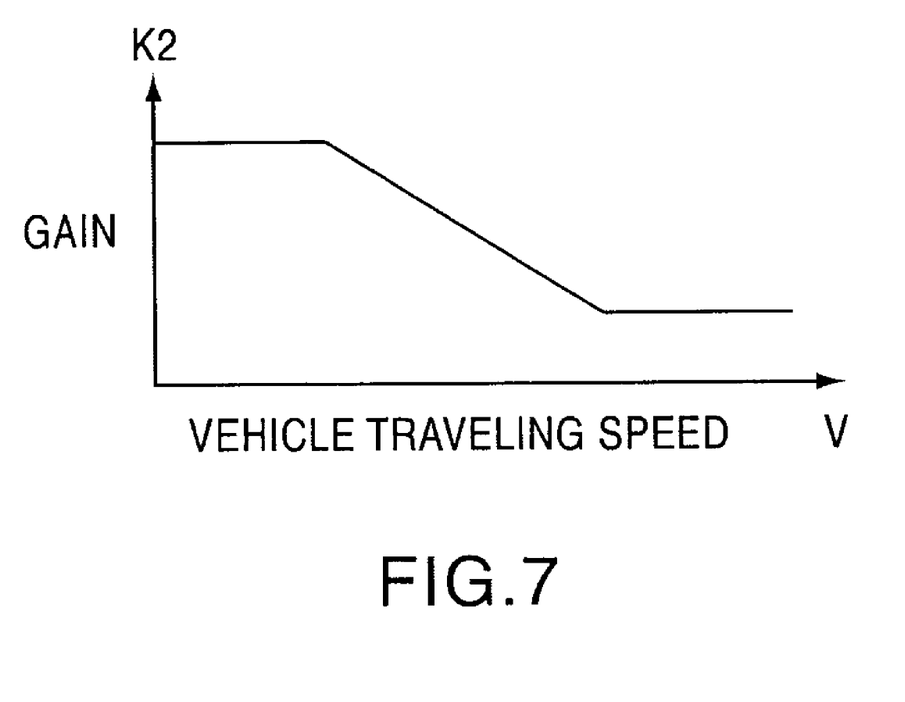
FIG. 7 is a graph illustrating the relationship between vehicle speed V and a gain K2.

As shown in FIG. 7 by way of example, the gain K2 has a high value at low vehicle speed V, is inversely proportional to vehicle speed V when vehicle speed V reaches a predetermined value, and is constant at a low value when vehicle speed V reaches a predetermined value.

The target yaw moment Ms is calculated when the departure flag Fout is ON and the target yaw moment Ms is set at 0 when the departure flag Fout is OFF. The target yaw moment Ms is set higher as departure from the lane of travel (a predetermined position) becomes greater.

As in Equation (8), the target yaw moment Ms is proportional to the subtraction value ($|Xs|-X_L$) and indicates the degree of departure from the lane of travel. Accordingly, step S7 may be performed after step S8, and the target yaw moment Ms may be compared with the first control threshold value $K1 \cdot K2 \cdot X_\beta$ or the second control threshold value $K1 \cdot K2 \cdot X_\mu$.

Subsequently, in step S8, the respective wheels 5FL to 5RR are activated in accordance with the control process determined in step S6.

That is, when the departure flag Fout is ON and the braking-power-difference control flag Fgs is OFF, the target yaw moment Ms calculated in step S7 is applied to the vehicle by steering the front wheels or the rear wheels. For example, a wheel control apparatus for steering the wheels, such as that described in Japanese Laid-Open Patent No. H7-10026, may be employed. In such apparatus, steering of the rear wheels is controlled in consideration of the road-surface coefficient of friction μ. In addition, the target yaw moment Ms calculated in step S7 may be applied to the vehicle by steering all four wheels.

As described above, the braking-power-difference control flag Fgs can be easily set at OFF as the coefficient μ becomes lower. Accordingly, when the vehicle is tending to depart from a lane having a low coefficient μ, lane-departure avoidance control is exercised mainly by the steering the wheels.

When the departure flag Fout and the braking-power-difference control flag Fgs are both ON, predetermined wheels are steered and a difference in braking power is applied respectively to a predetermined pair of wheels. Specifically, the left and right rear wheels are steered and the braking power difference is applied to the left and right front wheels.

The braking power difference is applied only to the pair of wheels (the front wheels in the present embodiment) other then the steered pair of wheels (the rear wheels in the present embodiment), but the barking power difference may be applied only to the steered wheels or to both the front and rear wheels. The braking power difference may be applied to the front and rear wheels, as well as to the left and right wheels. That is, by enhancing the braking power of the front wheels relative to the rear wheels, it is possible to further enhance the yaw moment applied to the front wheels. Specifically, by applying the same braking power to the left and right front wheels at the same time as steering the left and right rear wheels, the braking power difference is applied between the front and rear wheels.

Accordingly, as described above, the braking-power-difference control flag Fgs can easily be set at ON as the road-surface coefficient of friction μ becomes greater. As a result, when the vehicle is tending to depart from a lane having a high road-surface friction coefficient μ, lane-departure avoidance control is performed by steering the wheels and applying the braking power difference between the left and right wheels (or the front and rear wheels). When the departure flag Fout and the braking-power-difference control flag Fgs are set at ON at the same time, the timing of steering the wheels and that of applying the braking power difference may be matched or may be different.

When it is determined that the vehicle is tending to depart from the lane of travel, and the driver performs a braking operation, the vehicle may be decelerated by adding the master cylinder fluid pressure (braking fluid pressure) generated by the braking operation to the braking power.

The timing of activation of the alarm in step S5 may be matched with that of activation of departure avoidance control in step S8 or it may be earlier.

The controller 8 controls the output pressure of the master cylinder 3 to perform braking control of the wheels 5FL to 5RR, and also controls the front-wheel steering control unit 15 and the rear-wheel steering control unit 16 to perform steering control of the wheels 5FL to 5RR.

A series of operations performed in the above-described process is described as follows.

The various data are read from the sensors etc. (step S1) and vehicle speed V is calculated (step S2). Then, a tendency to depart from the lane is determined in advance on the basis of the various data read, and when the vehicle is tending to depart from the lane, the departure flag Fout is set at ON, and the departure direction Dout is detected. When the vehicle is not tending to depart from the lane, the departure flag Fout is set at OFF (step S3).

When the driver is intentionally changing lanes, the departure flag Fout is changed to OFF, and when the driver is not intentionally changing lanes, the departure flag Fout is maintained at ON (step S4). Here, when the departure flag Fout is ON, the alarm is activated (step S5).

It is determined on the basis of the coefficient of friction of the road surface μ and the configuration of the lane of travel whether lane-departure avoidance control should be exercised (step S6 and FIG. 4). That is, as lane curvature β increases or as the road-surface friction coefficient μ increases, a tendency to set the braking-power-difference control flag Fgs at ON is increased. On the other hand, the target yaw moment Ms to be applied to the vehicle through lane-departure avoidance control is calculated (step S7).

The respective wheels are activated based on the departure flag Fout and the braking-power-difference control flag Fgs obtained previously, and the target yaw moment Ms is applied to the vehicle (step S8).

Specifically, when the vehicle is tending to depart from the lane (Fout=ON) but the braking-power-difference control flag Fgs is OFF ($|Xs|-X_L<X_\beta$ or $|Xs|-X_L<X_\mu$), the target yaw moment Ms is applied to the vehicle by steering the wheels. When the vehicle is tending to depart from the lane (Fout=ON) and the braking-power-difference control flag Fgs is ON ($|Xs|-X_L \geq X_\beta$ and $|Xs|-X_L \geq X_\mu$), the target yaw moment Ms is applied to the vehicle both by steering the wheels and by applying braking power to the wheels.

That is, when the vehicle is tending to depart from the lane, the process of applying the yaw moment to the vehicle only by steering the wheels, and the process of applying the yaw moment both by steering the wheels and applying a braking power difference between the left and right wheels (or the front and rear wheels) are exchanged for each other on the basis of the status of the vehicle with respect to the lane, specifically on the basis of the degree of departure from the lane such as indicated by the subtraction value ($|Xs|-X_L$) or the target yaw moment Ms.

Figure 10A:
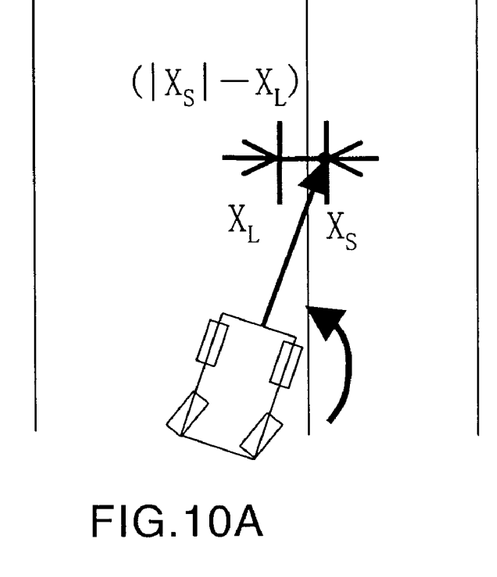
FIGS. 10A, 10B, and 10C are diagrams illustrating variation in lane departure control depending upon the degree of departure.
Figure 10B:
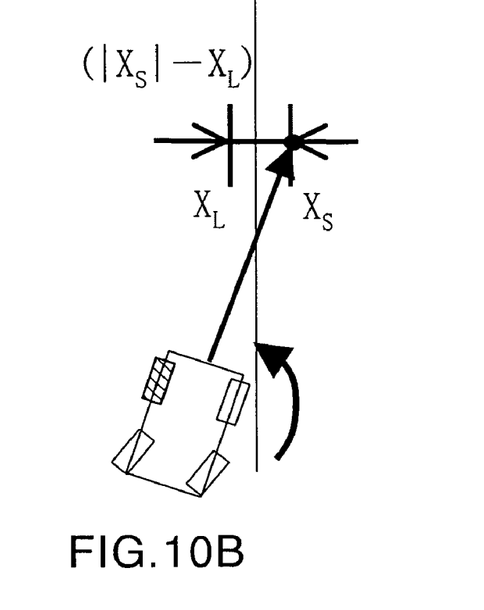
Figure 10C:
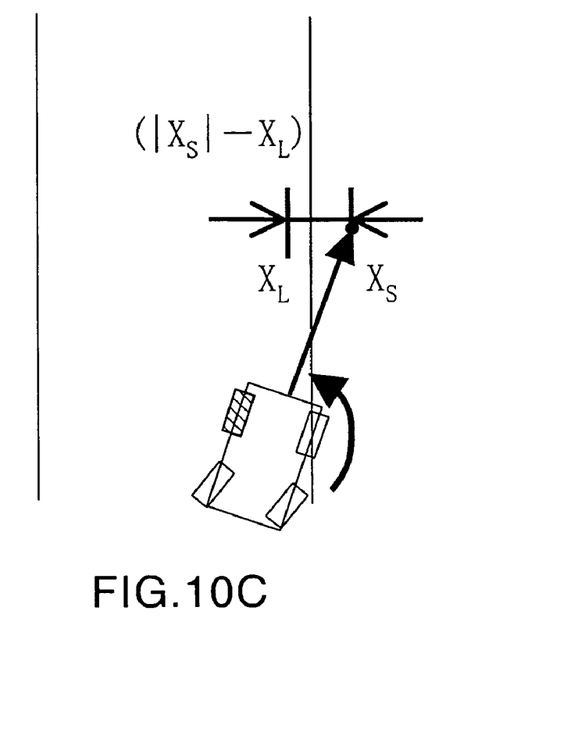

FIGS. 10A, 10B and 10C are diagrams illustrating variation in lane departure control depending upon the degree of departure when the vehicle is tending to depart from the lane (Fout=ON). FIG. 10A shows a vehicle tending to depart from the lane of travel. FIG. 10B shows a vehicle tending to depart from the lane of travel when the vehicle is being operated at high speed. FIG. 10C shows a vehicle tending to depart from the lane of travel when the vehicle is being operated close to a lane.

In FIG. 10(a), since vehicle speed is relatively low and the vehicle is apart from the lane, the subtraction value ($|Xs|-X_L$) is not greater than the first and second control threshold values. Therefore, lane-departure prevention control is performed by applying the yaw moment to the vehicle by steering the rear wheels 5RL and 5RR. On the contrary, when vehicle speed is high (FIG. 10B) or when the vehicle is close to the lane (FIG. 10C), the subtraction value ($|Xs|-X_L$) is great. Accordingly, the subtraction value is greater than the first and second control threshold values and thus the braking-power-difference control flag Fgs is changed to ON. As a result, lane-departure prevention control is performed by applying the yaw moment to the vehicle by steering the rear wheels 5RL and 5RR and by applying braking power to the front wheel 5FL at the departure avoidance side.

Accordingly, since the yaw moment is enhanced as the degree of departure is enhanced, it is possible to apply the necessary magnitude of yaw moment to the vehicle by setting the braking-power-difference control flag Fgs to ON.

When the vehicle is tending to depart the lane (Fout=ON) and the vehicle is traveling in a lane having a low road-surface friction coefficient μ, it is difficult to set the braking-power-difference control flag Fgs to ON, and thus the target yaw moment Ms is applied to the vehicle mainly by steering the wheels. When the vehicle is tending to depart from the lane (Fout=ON) and the vehicle is traveling in a lane having a high road-surface friction coefficient μ, it is easy to set the braking-power-difference control flag Fgs to ON and thus the target yaw moment Ms is applied to the vehicle by steering the wheels and by applying the braking power difference between the left and right wheels (or the front and rear wheels).

Figure 8A:
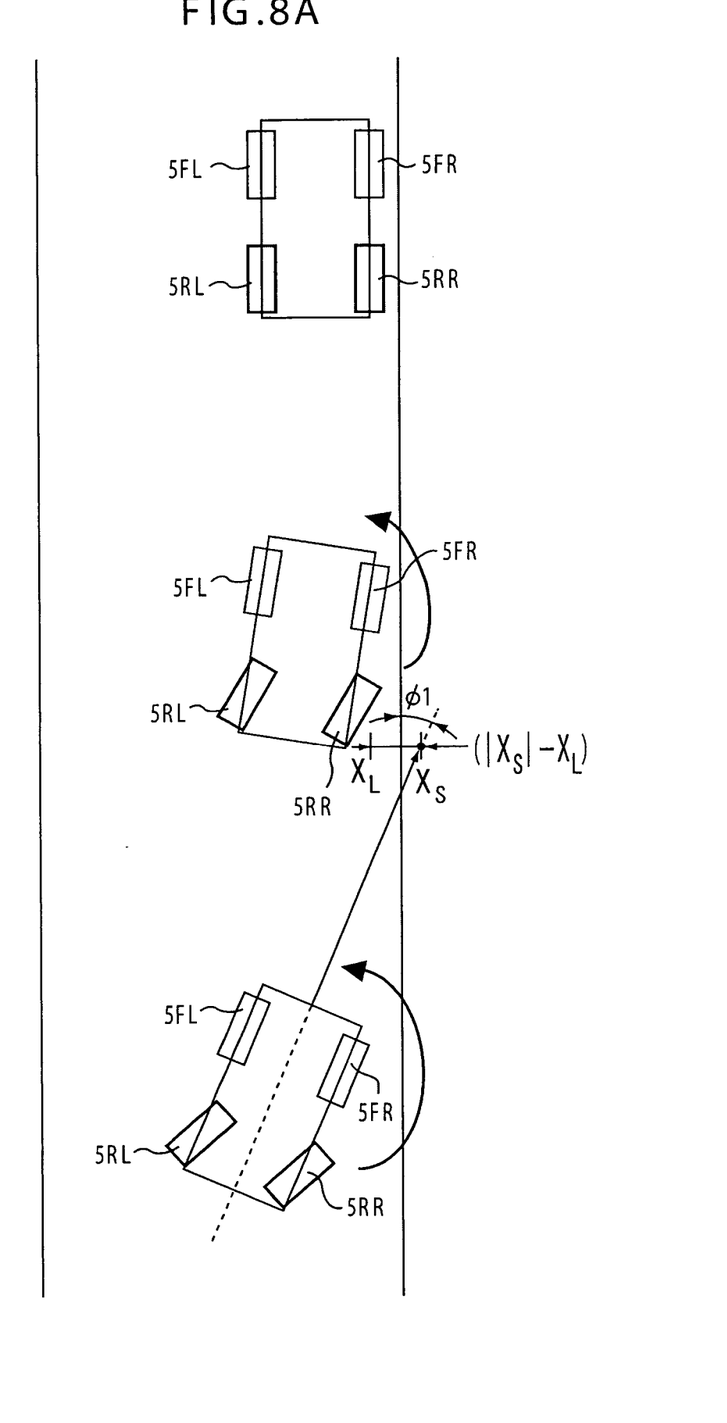
FIGS. 8A and 8B are diagrams illustrating variation in lane departure control depending upon traveling conditions of a vehicle with respect to a lane of travel.
Figure 8B:
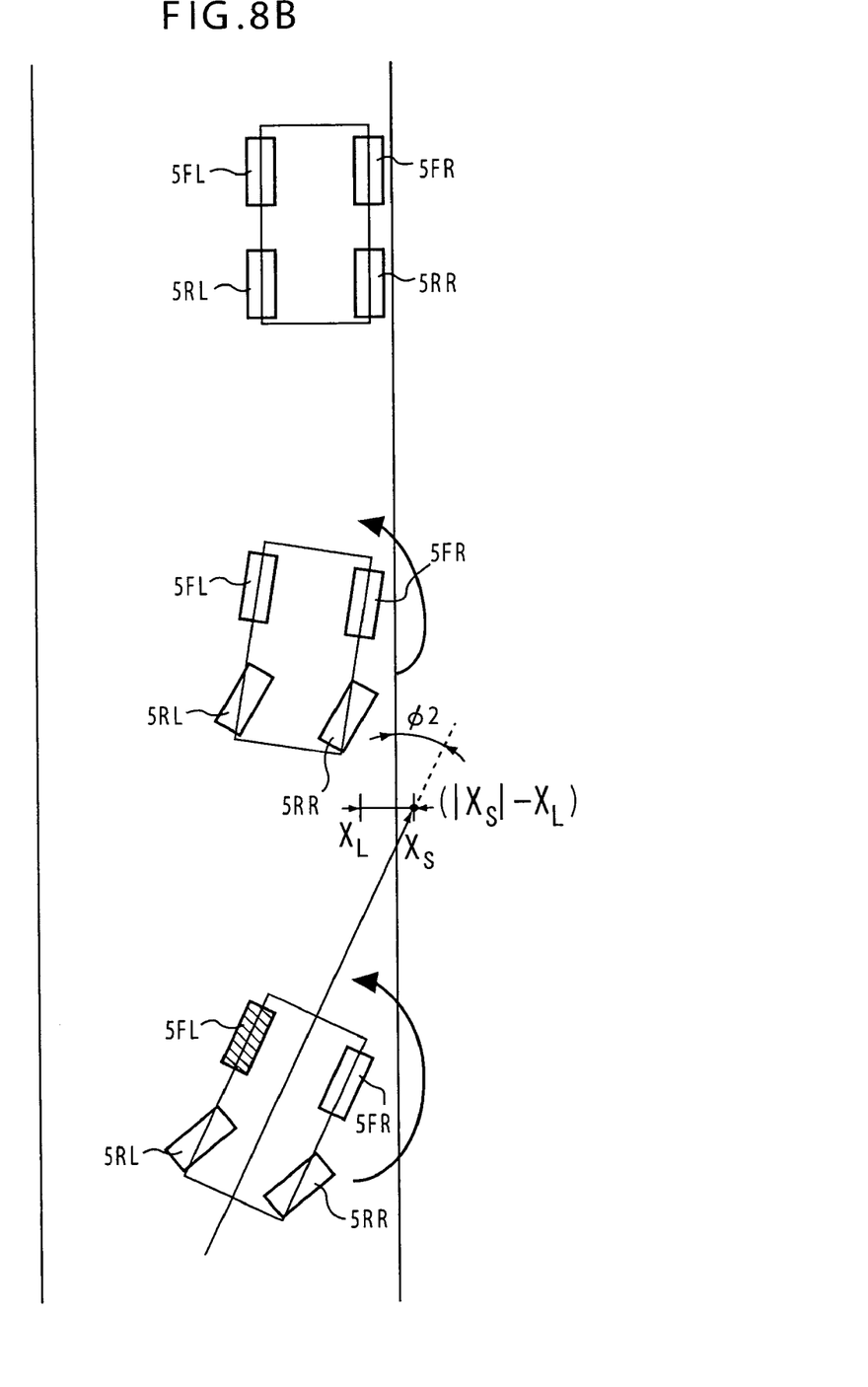

FIG. 8A illustrates lane departure control when yaw angle φ of the vehicle with respect to the lane is set at φ1 as a traveling condition of the vehicle, and FIG. 8B illustrates lane-departure control when yaw angle φ with respect to the lane of travel is set at φ2 (>φ1) as a traveling condition of the vehicle. In any case, it is supposed that the subtraction values (|Xs|–$X_L$) are the same.

As shown in FIG. 8A, when yaw angle φ is small (φ=φ1), the first control threshold value $X_β$ is set at a large value (FIG. 5). Accordingly, the braking-power-difference control flag Fgs is set at OFF. Therefore, the lane-departure avoidance control is performed by applying the yaw moment to the vehicle only by steering the rear wheels 5RL and 5RR. As shown in FIG. 8B, when is larger than a predetermined value (φ=φ2), the first control threshold value $X_β$ is set at a low value (FIG. 5). Accordingly, the braking-power-difference control flag Fgs is set at ON. Therefore, lane departure is avoided by applying the yaw moment to the vehicle both by steering the rear wheels 5RL and 5RR and by applying braking power to the front wheel 5FL at the lane departure avoiding side (applying the braking power difference between the left and right front wheels 5FL and 5FR).

Accordingly, variation in the degree of departure becomes greater as the yaw angle becomes greater. Accordingly, before the target yaw moment can vary greatly, the braking-power-difference control flag Fgs is rapidly changed to ON, thereby satisfactorily applying the yaw moment to the vehicle.

Figure 9A:
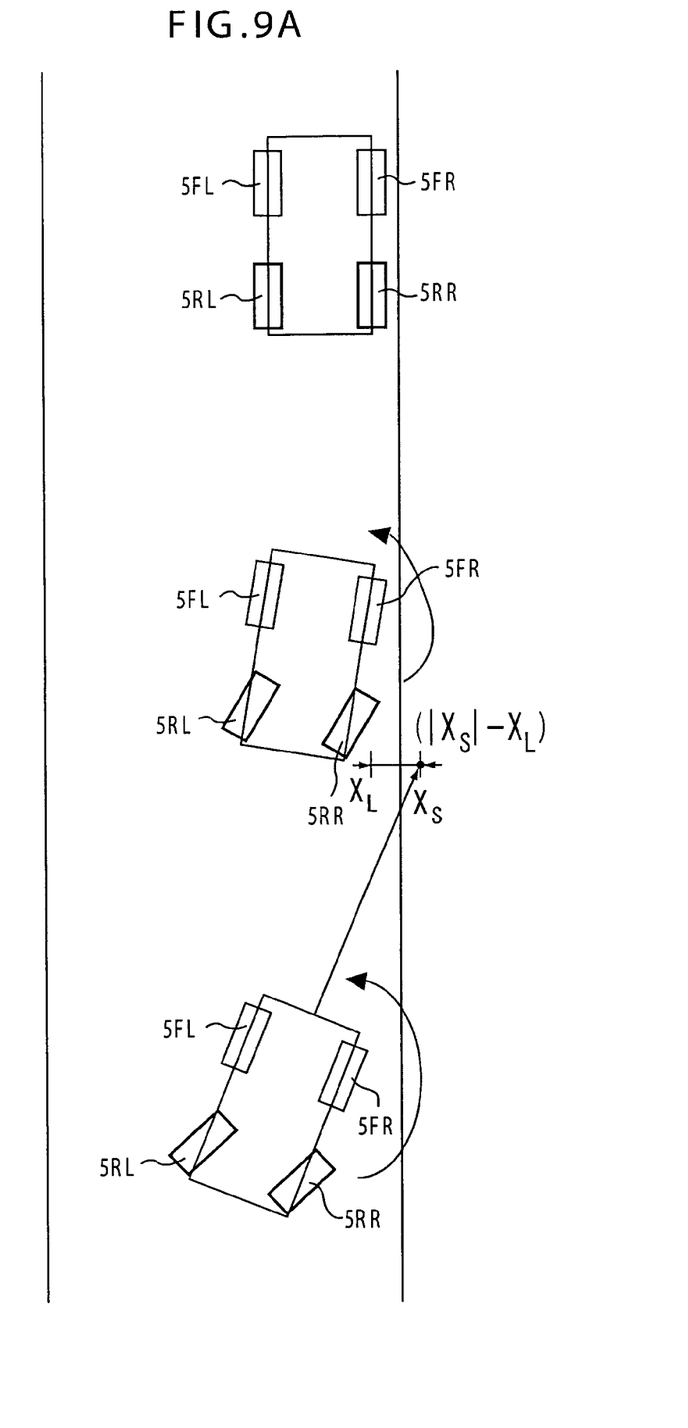
FIGS. 9A and 9B are diagrams illustrating variation in lane departure control depending upon variation in the coefficient of friction $\mu$ of the road surface.
Figure 9B:
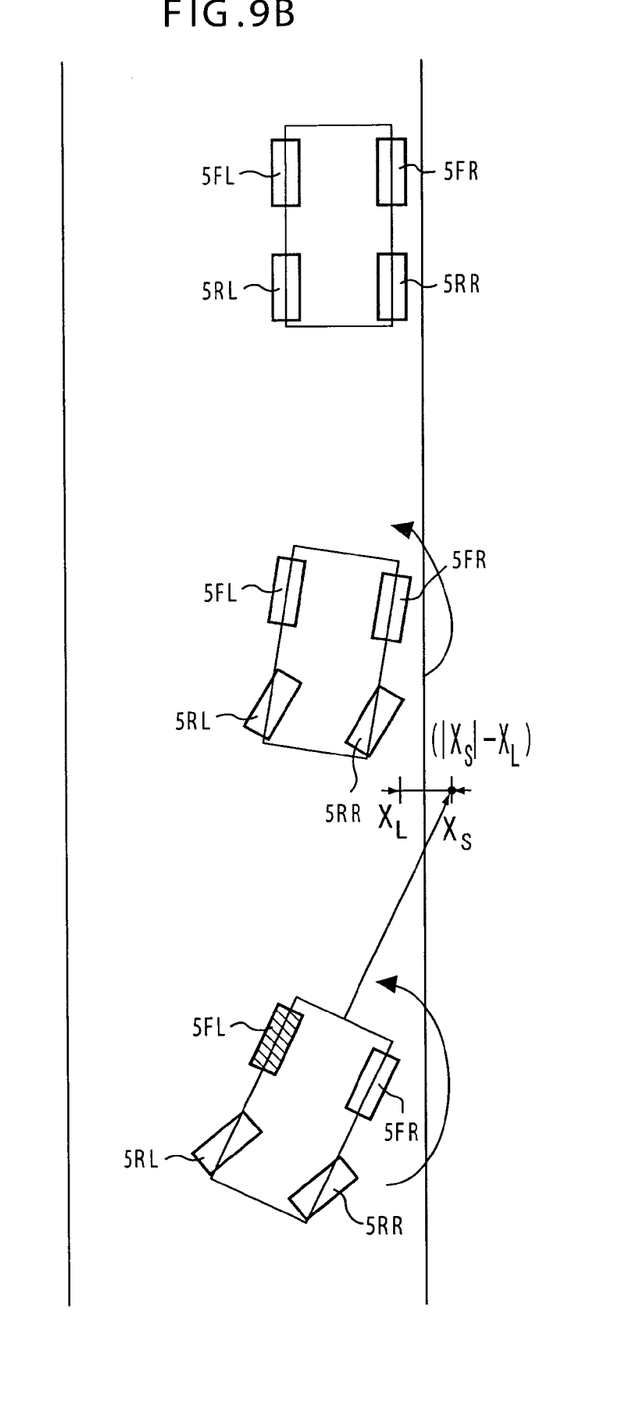

FIG. 9A illustrates lane-departure control in the case in which the vehicle is traveling in a lane having a low road-surface friction coefficient μ, and is tending to depart from the lane, and FIG. 9B illustrates lane-departure control in the case in which the vehicle is traveling in a lane having a high road-surface friction coefficient μ and is tending to depart from the lane (the departure determining flag Fout is ON). In any case, vehicle speed, current lateral displacement X0, or the yaw angle is constant. Accordingly, the subtraction value (|Xs|–$X_L$) or the target yaw moment Ms is completely constant.

As shown in FIG. 9A, when the vehicle is traveling in a lane having a low road-surface friction coefficient μ, the second control threshold value $X_μ$ is set at a high value (FIG. 6). Accordingly, the braking-power-difference control flag Fgs is set at OFF. Therefore, lane-departure avoidance control is performed by applying the yaw moment to the vehicle only by steering the rear wheels 5RL and 5RR. As shown in FIG. 9B, when the vehicle is traveling in a lane having a high road surface friction coefficient μ, the second control threshold value $X_μ$ is set at a low value (FIG. 6). Accordingly, the braking-power-difference control flag Fgs is set at ON. Lane-departure avoidance control is performed by applying the yaw moment to the vehicle both by steering the rear wheels 5RL and 5RR and by applying braking power to the front wheel 5FL at the lane departure avoiding side (applying the braking power difference between the left and right front wheels 5FL and 5FR).

In the present embodiment, the subtraction value (|Xs|–$X_L$) is compared with the first control threshold value $X_β$ and the second control threshold value $X_μ$ and the first and second control threshold values are changed on the basis of lane curvature β, yaw angle φ, and the road-surface friction coefficient. However, the present system is not so limited.

Figure 11:
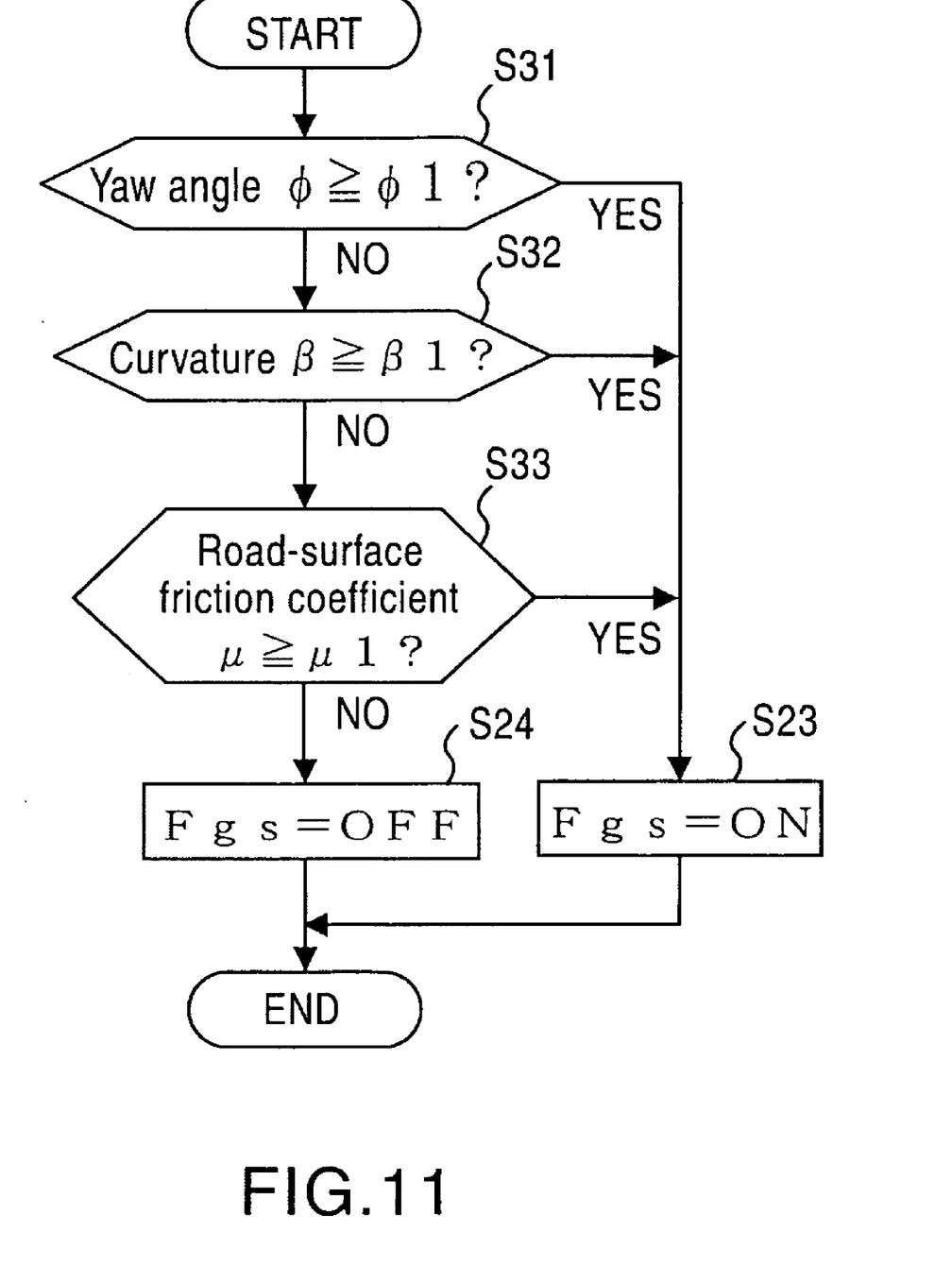
FIG. 11 is a flowchart illustrating a process of determining a lane departure control method executed by the controller.

For example, instead of setting the braking-power-difference control flag Fgs by comparing the subtraction value (|Xs|–$X_L$) with the threshold value, the braking-power-difference control flag Fgs may be set by comparing curvature β, yaw angle φ, or the road-surface friction coefficient directly with a predetermined threshold value. That is, as shown in the flowchart of FIG. 11, when curvature β is greater than or equal to a threshold value β1 (step S31) when the departure determining flag Fout is ON, when yaw angle φ is greater than or equal to a predetermined threshold value φ1 (step S32), or when the road-surface friction coefficient μ is greater than or equal to a predetermined value μ1 (step S33), the braking-power-difference control flag Fgs is set at ON regardless of the subtraction value (|Xs|–$X_L$) (step S23). When curvature β, yaw angle φ, and the road surface friction coefficient μ are lower than or equal to the predetermined threshold values, respectively, the braking-power-difference control flag Fgs is set at OFF (step S24). Yaw angle φ indicates the degree of departure, and the curvature β or the road-surface friction coefficient μ indicates road conditions. At least one of steps S31 to S33 may be performed.

According to this configuration, the necessary target yaw moment corresponding to the degree of departure or the road condition can be satisfactorily and rapidly applied to the vehicle.

In the present embodiment, the braking power difference is selectively applied to the wheels, in addition to steering the wheels. However, the present system is not limited to this configuration, but the yaw moment may be applied to the vehicle, for example, by applying the driving power difference. An example of the configuration for applying the driving power difference between the left and right wheels may include an active LSD (Limited Slip Differential Gear) which can actively apply the driving power difference by changing the distribution of driving power at the left and right wheels. In the configuration shown in FIG. 1, by disposing the active LSD (not shown) at one side of the front and rear wheels and controlling the distribution of driving power of the active LSD by the controller 8, it is possible to obtain the same advantages as those of the embodiment in which the braking power difference is applied between the left and right wheels. In addition, instead of generating the braking power difference between the front and rear wheels by applying braking power to the front wheels, the driving power difference may be applied between the front and rear wheels by applying a predetermined driving power to the rear wheels by the controller 8.

As described above, when the vehicle is tending to depart from the lane, the process of applying the yaw moment to the vehicle in order to prevent lane departure only by steering the wheels and the process of applying the yaw moment both by steering the wheels and by applying braking power to the wheels are alternated based on the traveling status of the vehicle with respect to the lane of travel, specifically, the subtraction value (|Xs|–$X_L$).

Accordingly, since the yaw moment is not always applied to the vehicle by generating a braking power difference regardless of the traveling conditions, and the yaw moment is not always applied to the vehicle by steering the wheels, it is possible to optimally prevent lane departure on the basis of the traveling conditions of the vehicle with respect to the lane of travel, without discomforting the driver.

As described above, by setting the threshold value $X_\mu$ for alternating on the basis of the road-surface friction coefficient $\mu$, the target yaw moment Ms is applied to the vehicle mainly by steering the wheels when the vehicle is tending to depart from the lane of travel (Fout=ON) but is traveling in a lane having a low road-surface friction coefficient $\mu$, and the target yaw moment Ms is applied to the vehicle mainly by steering the wheels and by selectively applying braking power to the wheels when the vehicle is tending to depart from the lane (Fout=ON) and is traveling in a lane having a high road-surface friction coefficient $\mu$.

Accordingly, it is possible to perform more effectively lane-departure avoidance control. For example, even though the braking power difference is applied when the vehicle is traveling in a lane having a low road-surface friction coefficient $\mu$, the braking power difference may not effectively contribute to the application of the yaw moment to the vehicle because of the low coefficient $\mu$. As a result, by applying the target yaw moment Ms to the vehicle only by steering the wheels or applying the target yaw moment Ms both by steering the wheels and by selectively applying braking power to the wheels, it is possible to perform departure-avoidance control more effectively.

As described above, when the wheels are steered and the braking power difference is applied between the left and right wheels, the left and right rear wheels are steered and the braking power difference is applied between to the left and right front wheels. Accordingly, since restoration of the vehicle is improved, it is possible to avoid lane departure more rapidly.

Although a certain embodiment of the present system and modifications thereof have been described, the system is not limited to such embodiment and modifications.

That is, in the embodiment described above, when the wheels are steered and a braking power difference is applied between wheels at the time of application of lane-departure avoidance control, the rear wheels are steered and the braking power difference is applied to the front wheels. However, the present system is not so limited. That is, the front wheels may be steered and braking power may be applied to the rear wheels. More particularly, any one side of the front and rear wheels may be steered and braking power may be applied to the other side. In the above-described embodiment, when the front wheels are steered and braking power is applied to the front wheels, it is possible to control the steering of the front wheels without discomforting the driver even when lane-departure avoidance control is carried out.

The braking power difference may be applied between the front wheels at the same time the front wheels are steered. Alternatively, the braking power difference may be applied between the rear wheels at the same time that the rear wheels are steered. In addition, as described above, by steering any one side of the front and rear wheels and applying braking power to the other side, it is possible to apply the yaw moment to the vehicle more effectively.

Although yaw angle $\phi$ and the road-surface friction coefficient $\mu$ are exemplified as traveling conditions, the present system is not limited thereto. For example, the control process may be performed only by steering the wheels when vehicle speed is lower than or equal to a predetermined value, and the control process of both steering the wheels and applying the braking power difference may be performed when vehicle speed is higher than the predetermined value. Similarly, the control only by steering the wheels and control by both steering the wheels and applying braking power may be alternated depending upon acceleration and deceleration or ascending and descending a slope in the road.

In the above-described embodiment, as shown in the Equation (2), the estimated lateral displacement Xs is calculated; that is, the departure tendency is determined, on the basis of yaw angle $\phi$. However, the present system is not so limited. That is, for example, the estimated lateral displacement Xs may be calculated as a value after lapse of a predetermined time T. Specifically, suppose that dx is variation (variation per unit time) of the lateral displacement X, the estimated lateral displacement Xs is calculated from the following Equation (9) by using the current lateral displacement of the vehicle X0:

$$Xs=dx \times T+X0 \qquad (9)$$

Similarly to the above-described embodiment, the estimated lateral displacement Xs calculated in this way and the departure determining threshold value $X_L$ are compared. In this modification, in the controller 8, step S3 is executed by a lane-departure tendency means for determining the tendency to depart from the lane, and step S6 (FIG. 4) is executed by a switching means for alternating between the process of applying the yaw moment only by steering the wheels and the process of applying the yaw moment both by steering the wheels and applying a braking power difference between the left and right wheels, on the basis of the traveling conditions of the vehicle with respect to the lane of travel, when the vehicle is tending to depart from the lane of travel.

What is claimed is:

1. A lane departure prevention system comprising:
   a position detector for detecting positional information of a vehicle with respect to a lane of travel;
   a determining unit for comparing the positional information with a first threshold value indicating a predetermined positional relation with respect to the lane of travel, and for determining a tendency of the vehicle to depart from the lane of travel on the basis of the comparison result; and
   a yaw moment applying unit for applying a yaw moment to the vehicle and alternating between a first process of applying the yaw moment to the vehicle only by steering the vehicle wheels and a second process of applying the yaw moment to the vehicle both by steering the wheels and applying driving/braking power to the wheels, on the basis of a traveling condition of the vehicle, when the determining unit determines that the vehicle is tending to depart from the lane of travel.

2. The lane departure prevention system according to claim 1, wherein the braking power is selectively applied to the wheels by applying a driving/braking power difference between left and right wheels.

3. The lane departure prevention system according to claim 1, wherein the braking power is selectively applied to the wheels by applying a driving/braking power difference between front and rear wheels.

4. The lane departure prevention system according to claim 1, wherein the yaw moment applying unit detects a degree of departure of the vehicle as the traveling condition at the time of determining the departure and selectively carries out one of the first and second processes on the basis of the degree of departure.

5. The lane departure prevention system according to claim 4, wherein the positional information includes a lateral displacement of the vehicle with respect to the lane of travel,
wherein the degree of departure includes a difference between the lateral displacement and the first threshold value or the yaw moment calculated from the difference, and
wherein the yaw moment applying unit selectively applies the yaw moment to the vehicle only by steering the wheels when the degree of departure is less than or equal to a second threshold value and selectively applies the yaw moment to the vehicle both by steering the wheels and by applying a differential driving/braking power to the wheels when the degree of departure is greater than the second threshold value.

6. The lane departure prevention system according to claim 5, wherein the position detector detects a curvature of the lane of travel in the front of the vehicle, and
wherein the yaw moment applying unit corrects the second threshold value in accordance with the curvature.

7. The lane departure prevention system according to claim 5, wherein the position detector detects a yaw angle of the vehicle with respect to the lane of travel, and
wherein the yaw moment applying unit corrects the second threshold value in accordance with the yaw angle.

8. The lane departure prevention system according to claim 5, further comprising a friction coefficient estimating unit for estimating a coefficient of friction of a road surface, and
wherein the yaw moment applying unit corrects the second threshold value in accordance with the estimated coefficient of friction.

9. The lane departure prevention system according to claim 4, wherein the position detector detects a yaw angle of the vehicle with respect to the lane of travel,
wherein the degree of departure includes the yaw angle, and
wherein the yaw moment applying unit selectively applies the yaw moment to the vehicle only by steering the wheels when the yaw angle is less than or equal to a third threshold value and selectively applies the yaw moment to the vehicle both by steering the wheels and applying a driving/braking power to the wheels when the yaw angle is greater than the third threshold value.

10. The lane departure prevention system according to claim 1, wherein the yaw moment applying unit detects a road condition of the lane of travel as the traveling condition at the time of determining the lane departure and selectively carries out one of the first and second processes on the basis of the road condition.

11. The lane departure prevention system according to claim 10, wherein the position detector detects a curvature of the lane of travel in the front of the vehicle,
wherein the road condition includes the curvature, and
wherein the yaw moment applying unit selectively applies the yaw moment to the vehicle only by steering the wheels when the curvature is less than or equal to a fourth threshold value and selectively applies the yaw moment to the vehicle both by steering the wheels and by applying a driving/braking power to the wheels when the curvature is greater than the fourth threshold value.

12. The lane departure prevention system according to claim 1, further comprising a friction coefficient estimating unit for estimating a coefficient of friction of a road surface,
wherein a road condition includes the friction coefficient; and
wherein the yaw moment applying unit selectively applies the yaw moment to the vehicle only by steering the wheels when the friction coefficient is less than or equal to a fifth threshold value and selectively applies the yaw moment to the vehicle both by steering the wheels and by applying a driving/braking power to the wheels when the friction coefficient is greater than the fifth threshold value.

13. The lane departure prevention system according to claim 2, wherein the yaw moment applying unit applies a driving/braking power difference between left and right front wheels and steering the rear wheels, when applying the yaw moment to the wheels both by steering the wheels and by applying a driving/braking power to the wheels.

* * * * *